United States Patent
McHenry et al.

(10) Patent No.: US 10,264,463 B2
(45) Date of Patent: *Apr. 16, 2019

(54) DSA RADIO POLICY-CONTROLLED CLASSIFIER RESTRICTION

(71) Applicant: Shared Spectrum Company, Vienna, VA (US)

(72) Inventors: Mark Allen McHenry, McLean, VA (US); Karl Ginter, Beltsville, MD (US); Michael Bartman, Potomac, MD (US)

(73) Assignee: Shared Spectrum Company, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,890

(22) Filed: Jul. 11, 2016

(65) Prior Publication Data

US 2016/0323750 A1 Nov. 3, 2016

Related U.S. Application Data

(63) Continuation of application No. 14/678,082, filed on Apr. 3, 2015.

(60) Provisional application No. 61/975,549, filed on Apr. 4, 2014.

(51) Int. Cl.
*H04B 17/00* (2015.01)
*H04W 16/14* (2009.01)
*H04W 24/02* (2009.01)
*H04W 64/00* (2009.01)
*H04W 72/08* (2009.01)

(52) U.S. Cl.
CPC ........... *H04W 16/14* (2013.01); *H04W 24/02* (2013.01); *H04W 64/006* (2013.01); *H04W 72/082* (2013.01)

(58) Field of Classification Search
CPC .......................... H04W 72/082; H04B 17/345
USPC ............ 455/454, 62, 67.11, 67.16, 434, 450, 455/41.2; 370/277, 329, 330
See application file for complete search history.

(56) References Cited

U.S. PATENT DOCUMENTS

| | | |
|---|---|---|
| 5,381,154 A | 1/1995 | Guerci |
| 5,392,050 A | 2/1995 | Guerci et al. |
| 5,499,030 A | 3/1996 | Wicks et al. |

(Continued)

*Primary Examiner* — Edward F Urban
*Assistant Examiner* — Max Mathew
(74) *Attorney, Agent, or Firm* — Morris & Kamlay LLP

(57) ABSTRACT

A dynamic spectrum access (DSA) radio communication device includes a plurality of signal classifier modules operating thereon, with each different classifier module able to classify a different radio signal type. A classifier scheduler module is provided to manage classifier use by selecting which classifiers to operate or not to operate and to manage the order that the classifiers are operated in. The communication device is configured to invoke policies that include control elements associated with adjusting the classifier scheduler module. The control elements associated with adjusting the classifier scheduler module tend to reduce the number of classifier cycles required to classify a radio signal. The device includes or can be provided with a plurality of different policies suitable for different radio environments and operating modes. Specifically, different policies may include different classifier control elements suitably matched to the present radio environment and/or operating mode.

23 Claims, 8 Drawing Sheets

(56) References Cited

U.S. PATENT DOCUMENTS

| | | | |
|---|---|---|---|
| 6,456,231 B1 | 9/2002 | McEwan et al. | |
| 7,184,777 B2 | 2/2007 | Diener et al. | |
| 7,606,335 B2 | 10/2009 | Kloper et al. | |
| 8,027,690 B2 | 9/2011 | Shellhammer et al. | |
| 8,059,694 B2 | 11/2011 | Junell et al. | |
| 8,175,539 B2 | 5/2012 | Diener et al. | |
| 8,326,313 B2 | 12/2012 | McHenry et al. | |
| 8,515,473 B2 | 8/2013 | Mody et al. | |
| 8,718,559 B2 | 5/2014 | Pärssinen et al. | |
| 2002/0107968 A1* | 8/2002 | Horn | H04L 12/1881 709/230 |
| 2004/0047324 A1* | 3/2004 | Diener | H04L 1/1664 370/338 |
| 2007/0004419 A1* | 1/2007 | Ji | H04W 72/1231 455/447 |
| 2008/0293353 A1* | 11/2008 | Mody | H04K 3/226 455/1 |
| 2009/0082031 A1* | 3/2009 | Kim | H04W 72/1263 455/452.2 |
| 2010/0105332 A1* | 4/2010 | McHenry | H04W 16/14 455/62 |
| 2010/0173586 A1* | 7/2010 | McHenry | H04L 27/0006 455/62 |
| 2012/0302190 A1* | 11/2012 | McHenry | H04B 17/345 455/226.3 |
| 2014/0341056 A1 | 11/2014 | Carbajal | |
| 2015/0208422 A1* | 7/2015 | Park | H04W 72/082 455/450 |
| 2015/0289143 A1 | 10/2015 | McHenry et al. | |

* cited by examiner sure, as it appears in the Patent and Trademark Office patent files or records, but otherwise reserves all copyright rights whatsoever. The following notice shall apply to this document: Copyright 2014-2015, Shared Spectrum Company.

DSA RADIO POLICY-CONTROLLED CLASSIFIER RESTRICTION

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2014-2015, Shared Spectrum Company.

2 BACKGROUND OF THE INVENTION

2.1 Field of the Invention

The illustrative, illustrative technology herein relates to systems, software, and methods for policy-controlled restriction of classifier use by Dynamic Spectrum Access (DSA) Radios.

The technology herein has applications in the areas of DSA Radio design and operation and the ability to change radio operation according to one or more situational changes.

2.2 The Related Art

Radio frequency (RF) spectrum is a limited resource in high demand that must be shared by all of those needing to make use of it. With increasing use of cell phones, Wi-Fi networks, Bluetooth devices, remotely operated vehicles, and other users of RF spectrum, efficient use of the available RF spectrum is increasingly important, and past practices, such as setting aside entire bands for specific purposes or users, such as television (TV), broadcast radio, emergency services, radar, and military use, are wasteful of and make inefficient use of available spectrum. The concept of dynamic spectrum access (DSA) has been created as a way to protect assigned spectrum users (primary users), while permitting use of the same spectrum by others (secondary users), as long as unacceptable levels of interference with primary user use of assigned spectrum are avoided. Development of DSA technology is in progress, as are regulatory changes to permit its use.

To avoid unacceptable interference with primary users, conventional DSA devices detect use of assigned spectrum, determine whether the use is that of a primary user, and if so, take actions to either avoid communication over the in use channel, e.g. by switching to another spectrum or channel, or to share the assigned spectrum in a manner that does not interfere with use by the primary user. Examples of sharing the in use spectrum include reducing transmitted power, directing transmissions along paths that will not cause unacceptable interference, or scheduling secondary communication during temporal breaks in the primary communication.

FIG. 1 is a diagram of a portion of a conventional DSA device employing a signal detector and a plurality of pre-defined signal classifiers operable on a digital processor. Each signal classifier is configured to determine whether the frequency spectrum or channel being probed by the detector is occupied or in use by a primary user and if so, which steps to take if a primary user signal is identified. The received signal data from the channel being received by a conventional DSA transceiver is input (1010) and passed to a signal detector (1020) and also to one or more classifiers (1030, 1040, & 1050). Each classifier uses a different classification method to attempt to classify the detected signal. The signal detector (1020) determines whether a signal is present (as opposed to noise), and outputs an indication of signal presence or absence (1025) to a frequency manager (1060). Output from any classifiers that successfully classify the signal (1045) is input, along with the output of the signal detector (1025), to the DSA frequency management component (1060) that determines whether a detected signal requires the current frequency in use to be vacated, or for other mitigating steps, such as power reduction or timing changes, be taken (1080), or not (1070).

OBJECTS OF THE INVENTION

In view of the problems associated with conventional methods and apparatus set forth above, it is an object of the present invention to provide systems and methods for policy control of classifier use in DSA radios, such control at least comprising means to prevent use of selected classifiers.

It is also an object of the present invention to provide means for removing obsolete, malfunctioning, or underperforming classifiers from service.

It is also an object of the present invention to provide means for managing radio resource consumption, such as CPU time or battery power, through management of classifier use.

It is also an object of the present invention to provide methods for classifier use ordering based on historical data related to classifier success in classifying signals as one means for managing radio resource consumption.

3 BRIEF DESCRIPTION OF THE DRAWINGS

The features of the present invention will best be understood from a detailed description of the invention and example embodiments thereof selected for the purposes of illustration and shown in the accompanying drawings in which.

4 DESCRIPTION OF SOME EMBODIMENTS OF THE INVENTION

Figure 1:
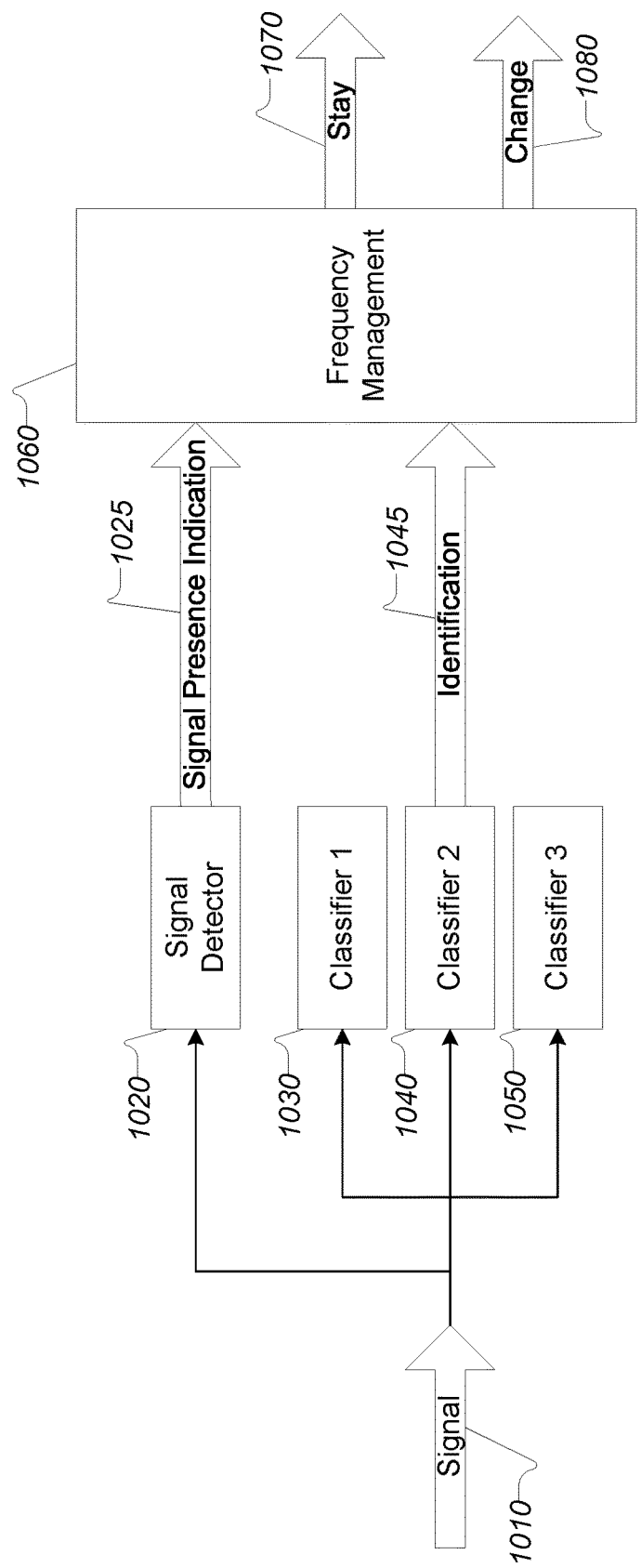
FIG. 1 is a diagram of a portion of a prior art DSA radio employing a plurality of classifiers to classify a signal.

Conventional DSA devices make use of "classifiers" to classify signals detected on an assigned spectrum or channel so that a decision can be made as to whether a detected signal is that of a primary user or a secondary user. Conventional classifiers operate in various ways, such as analyzing characteristics of the signal ("cyclostationary analysis"), e.g. detecting "beacons" or "pilot signals" within the assigned spectrum that can be matched to characteristics of a primary user of a particular type, or matching the detected signal origin or direction to known primary user locations. Other conventional classifiers are specialized for identification of specific signal or noise types, such as TV, cellular telephone, air traffic control radar, or man-made noise (e.g. transmission line noise).

In a conventional operating scenario, a plurality of signal classifiers are preconfigured as components of a conventional DSA radio, with each signal classifier operated as part of the frequency selection management module of the DSA radio. When one or more of the classifiers identify a primary user signal on a particular frequency spectrum or channel, that channel is removed from consideration for use by the DSA radio and other channels are evaluated. When a DSA radio incorporates a plurality of classifiers, all are typically used, in parallel or sequentially, to analyze a detected signal and classify it as to type. In some DSA radios with a plurality of classifiers, the available classifiers may be used sequentially until one classifies a detected signal, or until all have failed to do so. The sequence of classifier use is typically fixed by the design of the DSA radio. Such conventional techniques may be inefficient when the available classifier capable of identifying the specific detected signal is not one of the first classifiers used. Attempting to classify the signal with classifiers that are not capable of classifying it may delay classification and waste DSA radio resources, such as memory, processor cycles, and in mobile devices, battery power. As described herein, embodiments of the present invention may provide the ability for a DSA radio to identify a subset of classifiers that have a relatively high probability of identifying detected signals as primary user signals, to avoid use of those that are incapable of, or unlikely to, produce an identification of detected primary user signals at the DSA radio's location, and/or to define the order in which the identified classifiers are used so that those with the greatest likelihood of succeeding in identifying signals at the DSA radio's location, or which impose the least resource burden on the DSA radio, are used first.

In addition to the inefficiency of current DSA radio classifier use, there is typically no provision for dynamic update of classifiers to identify or classify new signal types, or to remove faulty classifiers from use. At least some DSA radios support update of the DSA software, which can include updating classifiers, but such updates require a break in operation of the DSA radio, user intervention, and/or may not happen in a timely manner. Embodiments of the present invention may provide various capabilities for dynamically removing faulty classifiers from use in a timely manner, and without interrupting DSA radio use is needed.

Figure 2:
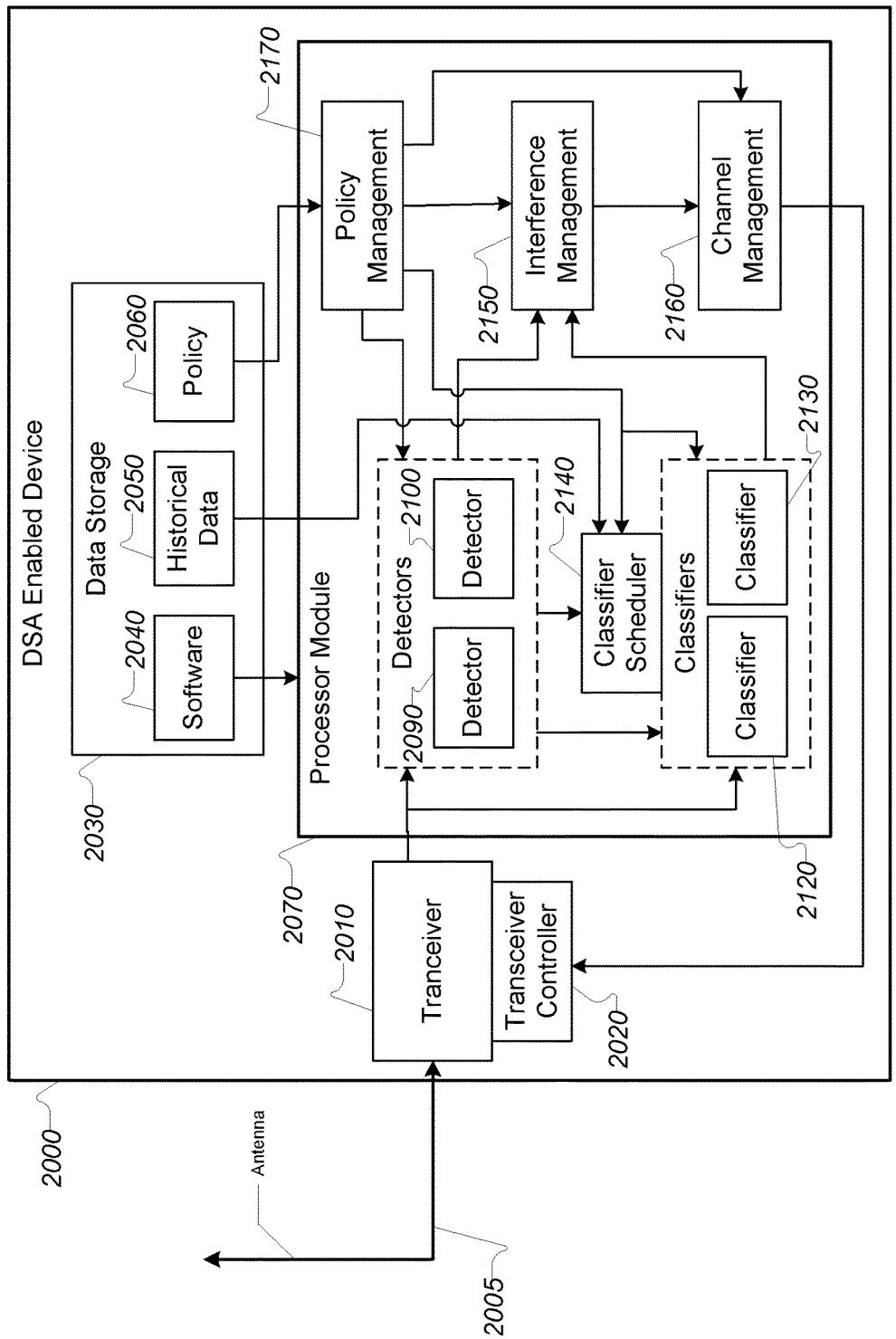
FIG. 2 is a diagram showing components of a DSA enabled device comprising aspects of an illustrative embodiment.

Referring now to FIG. 2, a non-limiting illustrative schematic diagram shows a channel management module (2000) operating on a DSA enabled radio device according to an embodiment of the present invention. The channel management module (2000) includes an antenna (2005) connected to a radio transceiver (2010). For receive-only operations, a transceiver may be replaced with a receive-only module without departing from the scope of the invention. A transceiver controller (2020) in communication with the radio transceiver operates to change the operating frequency of the transceiver (2010) from one channel to another, to either receive or transmit radio signal portions over a radio frequency channel selected by a channel manager (2160).

The DSA enabled radio includes a digital data processor, a portion of which is shown as a channel management sub module (2070). A digital data storage module (2030) is in communication with the digital data processor. The combined digital data processor and data storage module cooperatively manage the operation of the DSA radio system to communicate with other devices over one or more radio communication frequency bands or channels. More specifically, the channel manager module (2000) dynamically switches communication sessions and/or portions of a communication from one channel to another in order to utilize assigned and unassigned radio frequency spectrum or channels that become available for secondary use. In particular, in some operating modes, the DSA enabled radio system is configured to operate as a secondary user on one or more assigned spectrum channels without interfering with the use of any of the assigned spectrum channels by a primary user and the depicted channel manager (2000) is configured to manage channel selection and various aspects of channel section according to one or more software policies.

The digital data processor module (2070) preferably includes a single chip microprocessor, a central processing unit (CPU), or the like suitable for executing user defined loadable software and/or firmware modules. The software modules each perform processing tasks suitable for operating the DSA radio in an operating mode that communicates with other radio devices using dynamic spectrum access techniques outlined below. The data storage module (2030) preferably includes a non-volatile memory device suitable for storing the user defined loadable software or firmware modules and executing the software or firmware in cooperation with the digital data processor module. In addition, the data storage module (2030) operates to store digital data generated by elements of the local device and to communicate with other DSA or non-DSA enabled radio devices, including Wi-Fi enabled devices, and/or to exchange data with the other devices and/or to receive updates to any software or firmware module operating on the DSA enabled radio device. Alternately, numerous other well-known digital data processor and data storage modules, including a unitary device that operates as both a digital data processor and data storage module, are usable without deviating from the present invention. In further alternative illustrative embodiments, some or all data processing can be carried out using one or more hardware components that do not make use of loadable software, such as ASICs (Application Specific Integrated Circuits), FPGAs (Field Programmable Gate Arrays), or others, without deviating from the present invention. In non-limiting example embodiments the non-volatile data storage module (2030), may comprise flash memory devices, hard disc drives, Read Only Memory (ROM), Programmable Read Only Memory (PROM), Erasable Read Only Memory (EPROM), Electrically Erasable Programmable Read Only Memory (EEPROM), or combinations of these or other devices.

In operation, the transceiver (2010) is set to operate at a given radio frequency band or channel by the channel manager (2160). By listening to the selected channel, the transceiver (2010) generates an analog signal responsive to any electromagnetic energy present on the channel. The transceiver further operates to convert the analog signal to a corresponding digital radio signal and the digital radio signal is conveyed to the data processor module (2070) for processing by one or more detector modules (2090 &2100) and also by one or more digital signal classifier modules (2120 & 2130) for signal classification. Generally, each detector detects the presence of a digital radio signal and its characteristics, e.g. temporal, power amplitude, and spectral characteristics, and each classifier classifies the detected signal by comparing detected signal characteristics with known assigned spectrum user signal types or protocols, e.g. by classifying the detected signal as an 802.11 Wi-Fi signal, various cellular telephone signals such as LTE, 3G, 4G, a broadcast radio or television signal, a municipal safety or military signal, an air traffic signal, radar signal, etc.

According to an embodiment of the present invention, the operation of the detectors and classifiers are subject to policies managed by a policy manager module (2170). As shown in FIG. 2, the policy manager module (2170) receives and interprets policies from a policy storage module (2060). The policies may include rules for spectrum use, and as such directly and indirectly may include rules for operating one or all of the detectors (2090\2100), the classifiers (2120 2130), the channel manager module (2160) and for operating a policy scheduler (2140), which each may be operated in a manner that enforces or implements the spectrum use policy. In addition, the classifier scheduler module exchanges digital data with a historical data storage module (2050) as needed to track classifier schedules and other data useful in managing spectrum use by policy. Historical processing data (2050) may include, for example, times of day and geographic locations at which signals of specific types have been detected, and/or a success counts for each signal classifiers. The channel management module (2000) may include one or more digital radio signal sensing components, referred to herein as "detectors" (2090 & 2100), that are configured to process digital radio signal data received from the transceiver (2010) to detect radio signal transmissions of other devices in one or more spectral bandwidths or channels of the radio spectrum.

A DSA-enabled device (2000) can include one or more signal processing components, herein known as "classifiers" (2120 & 2130), which are configured to process data from the transceiver (2010) and optionally from one or more detectors (2090 & 2100), and to determine the type or types of signal present in the transceiver data. Detectors 2090 and 2100 may be provided as part of, or may be external to the DSA transceiver.

The channel management module (2000) may include a component, herein known as channel management (2160), which is configured to identify channels suitable for use by the DSA-enabled device based at least in part based on output data generated by one or more detectors and/or one or more classifiers.

The channel management module (2000) may include a component, herein known as a classifier scheduler (2140), which is configured to control the operation of one or more classifiers according to the requirements of a given policy.

The channel management module (2000) may include a component, herein known as "interference management" (2160), which is configured to use the outputs of one or more detectors and/or one or more classifiers to provide input to channel management useful for selection of transmission channels that comply with a given policy.

The channel management module (2000) may include a component, herein known as "policy management" (2170), which is configured to supply at least some aspects of policy relevant to each to one or more of detectors, classifiers, classifier scheduler, interference management, and channel management and further configured to receive, validate and determine the applicability of policy, locally store and locally and non-locally request policy from policy sources, or other aspects of policy management useful for a DSA enabled device.

Figure 3:
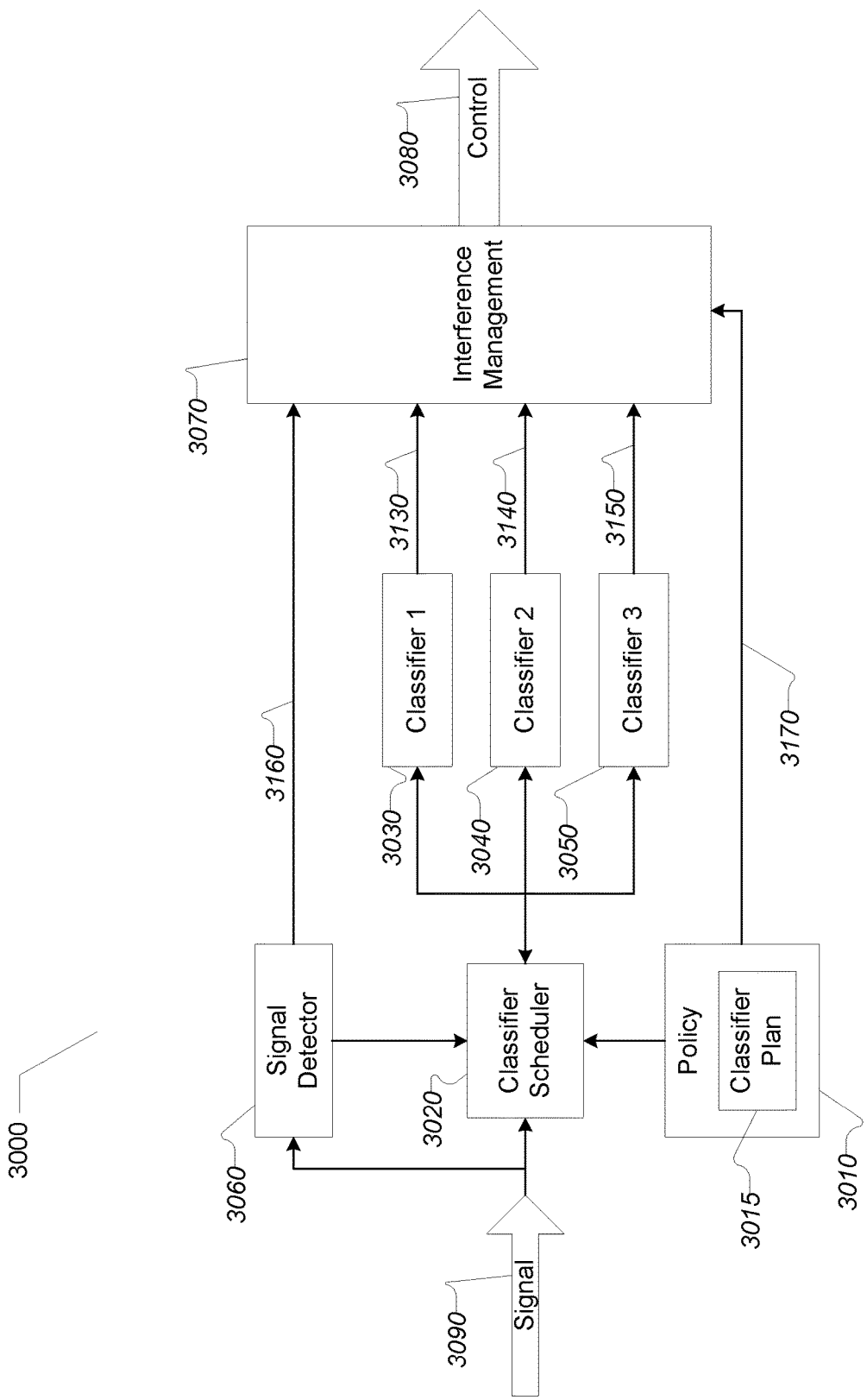
FIG. 3 is a diagram or a portion of a DSA radio employing aspects of an illustrative embodiment.

FIG. 3, shows a schematic diagram of an illustrative operating mode (3000) suitable for controlling a DSA radio device according to a spectrum use policy (3010) as disclosed herein. In the illustrated example, the spectrum use policy (3010) includes a classifier plan (3015) which is specified using a classifier plan specification language. The classifier plan (3015) includes classifier operating rules, set forth in the policy, for how to classify the signal (3090). The classifier plan (3015) may define a classifier schedule to be implemented by the classifier scheduler (3020). The classifier schedule may include details of which classifier to run first, which classifier(s) not to run at all, and contingencies for what to do when a classifier successfully classifies a signal or fails to classify a signal. Additionally, the policy (3010) may include classifier plans that are dependent on output from the signal detector, such as not to classify a signal that exceeds an upper power amplitude limit or fails to exceed a lower power amplitude threshold or the like. Accordingly the classifier scheduler (3020) receives a classifier plan (3015) from the policy (3010) and the detector signal (3060). Both inputs may be evaluated in view of the policy (3010) to determine a classifier schedule.

Once the classifier plan and classifier schedule are established, one or more classifiers (3030, 3040, & 3050) may operate on the signal (3090) under control of the classifier scheduler (3020) in an attempt to classify the signal. In various classifier scheduler operating modes, some or all of the classifiers may be operated simultaneously or in parallel. Alternatively or in addition, some or all of the classifiers may be operated in series or asynchronously. When operated in series, the classifier scheduler may dictate the order in which the classifiers are run and which classifiers, if any, should not be run. Once a signal is classified by a classifier and a classification (3130, 3140, or 3150) of the signal (3090) is conveyed to the interference manager, it may be preferred to halt operation of one, some, or all of any other operating classifiers. If all classifiers specified to be operated by the classifier scheduler fail to classify the signal (3090), the interference manager (3070) may takes any appropriate action, e.g. switching to another channel. However, other actions may be taken, such as operating classifiers that were not scheduled to be operated or the like, and these contingencies may also be set forth in the policy (3010).

As further detailed in FIG. 3, in addition to the classifier results (3130, 3140, 3150), a detector signal (3160) and a policy input (3170) are each conveyed to the interference manager. Accordingly, in some configurations the operating mode (3000) may include generating an interference manager control signal (3080) without invoking any of the classifiers (3030, 3040, or 3050). In particular, the policy (3010) may include elements for generating a control signal (3080) without classifying the detector signal, such as in cases where the signal detector (3060) fails to detect a signal that exceeds a lower power amplitude threshold, thereby indicating that the selected channel can be used without interfering with a primary. In further example operating modes, the policy (3010) may include operating modes that further alter the classifier schedule (3020) or suspend classification altogether after an initial signal on a channel has been classified, such as only running the classifier associated with classifying the classified signal type, or not running any classifier until characteristics of the signal (3160) indicate sufficient changes in the signal (3090) such as an increase in power amplitude or unexpected signal temporal or spectral characteristics.

Thus, according to some aspects of the illustrative operating mode (3000) described above, the policy (3010) controls the use of classifiers in a manner that may reduce classifier operating time and may decrease the time required to classify a signal (3090). When the policy successfully reduces classifier operating time, the time required to dynamically access an available communication channel is reduced, the power required to access an available communication channel is reduced, and processor time is freed up for other activities.

A spectrum use policy (referred to herein as a "policy") is a machine-interpretable specification that defines the required, permitted, and/or prohibited functionality of a DSA device, and, as used herein, may specifically defines functionality of channel management. Policies can include one or more policy elements. A policy element includes specifications related to at least one aspect of policy. Policy elements of a first policy can comprise references to one or more second policies. Such references can be used to incorporate the second policies, or policy elements from the second policies, into the first policy as if the second policy elements had been incorporated into the first policy directly. Policy references can be by location (e.g. a URL, URI, filename, network file location specification, etc.); by name (e.g. "policy-123") where the location to find the named policy is known, can be assumed, or where a search mechanism has been defined; or by a combination of these or other methods that will be well understood by those with skill in the art. Some or all of the policy elements of a first policy can be combined with some or all of the elements of a second policy to form a third policy. A policy element may be device dependent, device capability-dependent, time-dependent, and/or location-dependent. A policy element also may vary with user input or device authorizations. Devices can be configured with a default policy for use when no other policy is available, or to define methods to receive and validate updates to policy from authorized remote devices that then partially or completely replace the default policy. Policy can be distributed by use of hardware devices (e.g. flash drives, ROM chips, disk drives, and DVD-ROM), interfaced with the DSA radio through wired or wireless networks, through wireless broadcast, or by any other method or methods deemed proper by those with skill in the art.

Policies can originate with regulators, manufacturers, developers, network and system operators, as well as DSA device users (referred to herein, collectively and individually, as "policy originators"). Policies can be supplied to a DSA device in a number of ways, such as over the air, by way of wired networks, through use of plug in modules or media, by interaction with a user through a user interface, by incorporation into the device by its design or construction, or other means that depend on various factors that will be apparent to those with skill in the art. DSA devices can employ a plurality of methods to acquire policy, such as by incorporating a default policy by design, accepting user input policy via a user interface, and acquiring regulatory policy over the air from a wireless policy server. Due to the possibly dynamic nature of classifier plans, policy distribution and update methods that support dynamic policy adjustments may be preferred for use.

Policies as disclosed herein can be universally applicable to all DSA radio devices, can be specific to a class of DSA radio devices, or can differ for each specific DSA radio device, device type, model, revision level, purpose, use, power output, or other characteristics or combination of characteristics, such as having a static location or being a device of a specified type that is intended for mobile use. Applicable classifier use policies can vary with the geographic location of the device, with current or anticipated speed of movement of the device, with time of day, time of year, with power transmission limitations of the device, with network access by the device, with remaining battery power, and/or other conditions of the DSA radio itself. Additionally, applicable classifier use policies can vary with current situational conditions such as the presence of RF interference; terrain effects such as buildings, mountains, or the like preventing line or sight access to a transceiver; with local restrictions to the use of specific radio frequencies or ranges of frequency; or other factors that may be dictated by the policy or that may be inferred from historical data, detector signals, or classifier results.

Policies can use rules, or any other method, to specify attributes of devices for use in determining whether specific policy elements apply. Attributes can comprise specific hardware or firmware characteristics, such as a unique device ID, device capabilities such as the availability of Wi-Fi or Bluetooth, or information or capabilities present in the device, such as specific classifiers, certificates, spectrum database data, policy, or configuration parameter settings.

Policy requirements in may include at least a capability to specify classifiers that are not permitted for classification of detected signals. Such a capability can be provided through specification of classifiers that are permitted, with all others being prohibited, by specification of classifiers that are not permitted, with all others being permitted, or by specification of both permitted and not permitted classifiers. Specification of classifiers can be accomplished by listing the signal types that can be classified by the classifiers being so specified (e.g. 802.11 Wi-Fi, LTE, Weather Radar, or TV), by naming classifiers explicitly (e.g. manufacturer, software name and version, etc.), by listing the types of classification methods used (e.g. cyclostationary analysis, pilot signal identification, etc.), by combinations of these or other methods, or by other means as will be known to those with skill in the art.

In addition to policy-controlled classifier specification, spectrum use efficiency can be enhanced by a policy that includes elements that specify limits on classifier restriction so that restrictions are only imposed where and when necessary. For example, policy restrictions on classifier use that vary with location, speed, direction of travel, time period, device type, device model, device capabilities, specific authorization being granted, frequency band, possession of one or more digital certificates, group or network membership, locations of known transmitters, and/or frequency use (e.g. by use of a database of primary user sites and frequencies), or combinations of these and/or other factors, may be used. Such policy capabilities can be supported by use of known policy specification, distribution, and update methods as will be well understood by those with skill in the art. These methods may be particularly useful when policy requirements vary with location, when policy varies over time, when policy varies by DSA network, or when the timing of restrictions on classifier use is not known in advance or is of an unpredictable nature that requires dynamic policy adjustments to prevent unacceptable interference with primary users.

A policy may include elements used to specify one or more classifier operational parameters, such as thresholds for use in determination of signal presence in a signal classification algorithm.

In some illustrative embodiments, one or more DSA devices can provide locally sensed environmental information, such as spectrum use, RF interference levels, or types of signals being detected, to a central coordination site where such collected information is used at least in part to adjust policies that are then distributed to some or all of the one or more DSA devices as necessary. A central coordination site can have access to information not available to DSA devices that may be useful for adjusting policy requirements so as to maximize efficiency of spectrum use while maintaining protections against unacceptable interference with primary users, or for any other purpose or purposes, such as creation or adjustment of RF exclusion zones, or to implement a set of apparently arbitrary policy changes in order to obfuscate when primary users, such as government or military, are actually operating in a given area. For example, a classifier on a DSA device may classify Wi-Fi signals on a particular channel as secondary user signals, but the central coordination site has information that a primary user is currently operating in the same area and legitimately using assignee spectrum to transmit signals in a manner that can be classified by at least some classifiers as a Wi-Fi signal, when they are not Wi-Fi signals. To prevent interference with this primary user, the central coordination site can adjust policy to prohibit use of those classifiers that can mistake the primary user signal for a Wi-Fi signal and to treat an unclassifiable signal as a primary user signal, and thus cause DSA devices in the area that are using such classifiers to cease use of them and therefore be unable to classify the primary user signal and begin treating the unclassifiable signal as a primary signal. Such a policy change can result in actual Wi-Fi signals being treated as primary user signals as well, but non-interference with primary user signals is paramount and this side-effect is of lesser importance. When the central coordination site receives information or otherwise determines that the primary user is no longer operating in a manner that can be mistaken for a Wi-Fi signal, the policy can be adjusted again to remove the restriction.

Referring again to FIG. 3, the policy (3010) may be used by at least the classifier scheduler (3020) and the interference management component (3070), for the purposes detailed herein. Policy mused by any of the classifiers (3030, 3040, & 3050) operating on the device, as determined by the design and configuration of each such classifier. In configurations that employ classifiers capable of using policy, the policy may be filtered through the classifier scheduler (3020), which provides or operates each classifier with the policy elements required. In other configurations that employ classifiers capable of using policy, the policy may be made available in whole to each classifier, and the classifier determines which policy elements are relevant, if any. In typical devices, policy will comprise additional policy elements and have additional uses related to device operation that are not related to the classifier policy aspects and uses described herein. Provided that policy includes at least one classifier plan that is made accessible in implementable form to the classifier scheduler and interference management components, and in some cases one or more classifiers, the specific form and any additional aspects of policy generally are not relevant to embodiments of the current invention disclosed herein other than as specifically indicated.

Classifier plans specified by policy may include requirements and limitations for the operation of the classifier scheduler and interface management components. In configurations that use dynamic policy updates, classifier plans also may be dynamically updated as part of a dynamic policy update. Classifier plans can be incorporated, in whole or in part, into policy. Alternatively or in addition, classifier plans, or portions thereof, can be referenced by policy and obtained from the referenced source or sources (e.g. by URL and an HTML GET operation, by filename and file read operation, by policy server node address and a policy request, etc). Classifier plans also can be specified by a unique identifier and accessed from one or more known sources by use of the unique identifier. For example, classifier plans may be accessed from a policy cache, a list of policies or policy references indexed by the unique identifier, or by a search of one or more known classifier plan sources using the unique identifier as a search key. Alternatively or in addition, classifier plans may be specified by capability, such as "capability to identify LTE signals", "capability to identify 802.11 signals", etc. and any available classifier plan, or combination of plans, meeting the specified capability requirements are acquired and implemented. In additional illustrative embodiments, combinations of two or more of the above methods are used, such as a unique identifier that specifies an entry in a list of policy references, or a classifier plan made up of a classifier plan incorporated into policy in combination with a classifier plan acquired through a reference.

Classifier plans can be organized by policy into a hierarchy, where plans higher in the hierarchy supersede those lower in the hierarchy wherever there is a conflict. For example, if a higher level plan prohibits the use of classifiers capable of classifying TV signals, and a lower level plan specifies use of a specific classifier for classification of TV signals, the specific TV classifier will be disabled by a classifier scheduler implementing the combined classifier plan.

Classifier plans can be conditional. For example, a classifier plan can be made conditional by making the policy element that specifies it conditional. Alternatively, the classifier plan itself can contain conditional elements. Conditions can include, for example, date, time of day, location, completion status of one or more other classifiers, device resource availability or utilization levels, the time since a given classifier successfully classified a signal, and/or signal power level, or any combination thereof. For example, the order (i.e. parallel, sequential, and order within a sequence of classifiers) can be conditional on available resources, or the enablement of classifiers can depend on the completion status of one or more previous classifiers, or a classifier can be enabled only if the signal power is above a threshold level.

A portion of an illustrative non-limiting policy specification that uses a form of the XML document standard to specify a classifier plan appears below.

```
1.   <classifier_restrictions>
2.     <time start="20130824130000" end="20130824170000">
3.       <area loc="38.925983 , -77.244795" radius="1km">
4.         <classifier match="and" mode="prohibit">
5.           <select_type type="cyclostationary"/>
6.           <select_signal signal="LTE"/>
7.         </classifier>
8.         <classifier>
9.           <select_name name="DSA-Comm ver 1.4"/>
10.        </classifier>
11.      </area>
12.    </time>
13.    <time match="2013??01??????">
14.      <area>
15.        <classifier mode="prohibit" ignore="cert-5">
16.          <select_signal signal="Wi-Fi"/>
17.        </classifier>
18.      </area>
19.    </time>
20. </ classifier_restrictions>
21. <classifier_schedule>
22.    <parallel priority=1>
```

```
23.         <classifier name="TV_Classifier" mode="permit">
24.         <classifier name="LTE_Classifier" mode="permit">
25.     </parallel>
26.     <sequentialpriority=2 halt=1>
27.         <classifier name="Police_Classifier" mode="permit">
28.         <classifier name="WeatherRadar_Classifier" mode="permit">
29.         <classifier name="ApproachRadar_Classifier mode="permit">
30.     </sequential>
31. </classifier_schedule>
```

The above classifier plan policy elements specify two classifier restrictions and a classifier schedule. The first restriction is specified by lines 2 through 12, and the second by lines 13 through 19. The classifier schedule is specified by lines 21 through 31.

The first restriction applies during a time period beginning at 1 pm on Aug. 24, 2013 and ending at 5 pm on the same day, and only to an area within 1 kilometer of latitude 38.925983, longitude −77.244795. It specifies that classifiers using cyclostationary analysis methods to detect LTE signals are prohibited in the specified area during the specified time.

The second restriction applies at times matching the specified pattern. That is, any time of day on the first day of every month in the year 2013. No specific area is specified; therefore, the restriction applies everywhere. The restriction prohibits classifiers capable of classifying Wi-Fi signals. Line 15 includes an "ignore" attribute specifying that the classifier restriction can be ignored by devices that possess authorization certification "cert-5". This authorization certification could be a reference to a digital certificate useful to excuse compliance with the classifier restriction, for example, to permit the primary user to continue to use Wi-Fi signal classifiers during the time the restriction is active for others.

The classifier schedule specifies that "TV_Classifier" and "LTE_Classifier" are to be run in parallel, after which the "Police_Classifier", "WeatherRadar_Classifier", and "ApproachRadar_Classifier" are to be run sequentially, in that order, until one of them classifies the signal.

The specific example of a classifier schedule disclosed above is provided as an illustrative example. Those of skill in the art will understand additional methods for specifying locations, times, priorities, classifier methods, authorizations, and other policy aspects, such as the use of "regular expressions" for specifying matching criteria, delta times for specifying relative points in time, and lists for specifying networks or specific devices. Other methods for specifying classifier plans, or for incorporating other policy capabilities described herein, will be well understood by those with skill in the art.

The classifier scheduler may be a single component dedicated to carrying out the functions of a classifier scheduler. Alternatively, the classifier scheduler may be one aspect of a single component that provides multiple functions within a device. Similarly, a classifier scheduler may include multiple components that collectively carry out the functions of a classifier scheduler.

The classifier scheduler can be implemented as software loaded from a non-volatile storage medium into a processor suitable for execution of the instructions making up the classifier scheduler. Alternatively or in addition, a classifier scheduler as disclosed herein can be implemented in hardware, such as by use of Field Programmable Gate Arrays (FPGAs) or Application-Specific Integrated Circuits (ASICs). More generally, a classifier scheduler can be implemented by any combination of hardware and/or software components and techniques that in combination provide the classifier scheduler functionality described herein.

The classifier scheduler may interpret classifier plans and may operate to control the use and/or behavior of classifiers according to policy. The classifier scheduler can enable or disable use of any given classifier for identification of a signal. Enablement or disablement can be dependent on a variety of factors, such as signal detector outputs, the current time, the current date, the location of the device, available device resources, outputs from other classifiers, historical classifier outputs, or any combination of these or other factors. The factors used to determine whether to enable or disable a given classifier can be specified by policy. Enablement of a classifier does not cause or require that the classifier be used. Rather, enablement of a classifier as disclosed herein makes the classifier available for use. In some cases multiple classifiers may be enabled, though only a subset of the enabled classifiers are used for classification. Disablement of a classifier prevents its use while it is disabled.

A classifier may be configured to classify one or more types of signal. In some configurations, each classifier may be dedicated to a single signal type, though generally any combination of single-type and multiple-type classifiers may be used within a single device or system.

A disabled classifier may not process a signal received by a device, thus reducing resource use and thereby improving the efficiency of the device. Similarly, a classifier may not produce any signal identification output. Alternatively, a disabled classifier may produce an output, but may have the signal identification output blocked from input to an interference management component or other component of a device, or may produce a signal identification output indicating that the signal was not identified. Alternatively, a disabled classifier may partially or completely process a received signal, but may not produce any signal identification output, may have a signal identification output blocked from input to an interference management or other component, or may always produce a signal identification output indicating that the signal was not identified.

An enabled classifier may process a signal until the signal is identified, or until the classifier determines that the signal cannot be identified by the classifier. If a signal is identified, the classifier may produce a signal identification output indicating the type of signal identified. When a signal is identified by a classifier, the classifier may produce a signal identification output indicating which classifier identified the signal. For example, a signal identification output may include data that indicates the type of signal identified by the classifier, as well as data that indicates the specific classifier that identified the type of signal. A classifier also may produce an output indicating a confidence level for identification of the signal. In general, any combination of these signal identification output types may be produced when a classifier identifies a signal.

An enabled classifier that fails to identify a signal may not produce any signal identification output, may produce a signal identification output indicating that the signal was not identified, or may produce a signal identification output indicating a confidence level that the signal cannot be identified by the particular classifier.

An enabled classifier may produce output that is sent to a classifier scheduler as disclosed herein, which may be used as a factor in enablement or disablement of the classifier. The classifier output also may be used by the classifier scheduler in conjunction with policy to select a new classifier plan to implement. Classifier output can be produced whether or not the classifier successfully identifies the signal. For example, if a classifier is configured to determine whether a signal is amplitude modulated (AM), and it fails to identify a signal as an AM signal, it can produce output to the classifier scheduler that causes all AM signal-related classifiers to be disabled, thus saving the resources that might otherwise be consumed by AM signal-related classifiers, and avoiding any potential misclassifications by AM signal-related classifiers. In this way, both efficiency and accuracy of classification can be enhanced.

The enabling or disabling of classifiers by the classifier scheduler can vary over time, as specified by policy. For example, policy can specify that a first classifier be used to classify LTE signals until 1 Jan. 2014, after which a second classifier is to be used for classifying LTE signals. This capability enables synchronization of classifier upgrades, for example to meet regulatory requirements. Another example might be use of a first classifier from 6 am to 6 pm, and a second classifier from 6 pm to 6 am. Still another example can involve disabling faulty classifiers, or classifiers that have become inappropriate under a changed regulatory policy, where specifying that a classifier may not be used after a specified date and time prevents its further use unless and until policy is changed to permit its use again. The enablement or disablement of a first classifier is unconnected with the enablement or disablement of any other classifier unless policy specifies otherwise.

In addition to controlling the enabled or disabled state of all classifiers in accordance with classifier plans, the classifier scheduler also may specify and/or control the order of use, run-time priority, timing of use, and resource allocation of classifiers.

Classifiers can be operated in parallel, such as though hardware support (e.g. multi-processor or multi-core hardware), by use of time-share methods, or a combination of both. Classifiers also can be operated serially, with one classifier beginning processing when the prior classifier processing has completed. Classifiers also can be operated in a series-parallel mode, with some classifiers operating in parallel and others operating serially. The specific sequence in which classifiers are operated, and the requirements as to completion status of previous classifiers for each classifier to begin processing, is specified by a classifier plan. The requirements for completion status of previous classifiers can include, for example and without limitation, that the classifier has completed processing (i.e. classified the signal or determined that it cannot classify the signal), that the classifier has classified the signal, that the classifier has failed to classify the signal, that the classifier has classified the signal with a confidence value above, or below, a threshold, that the classifier has failed to classify the signal with a confidence value above, or below, a threshold, and that the signal has been classified as being of a particular signal type (e.g. AM, FM, radar, 802.11, TV, etc).

Run-time priority refers to the relative percentage of available processing time assigned to a particular classifier when classifiers are operated in parallel in a time-share system. Classifiers with a higher run-time priority are given a larger percentage of available processing time than classifiers with lower run-time priorities. Assigning higher run-time priorities to classifiers with a greater likelihood of classifying a signal can result in a quicker classification than would be the case if such classifiers did not receive higher run-time priorities. In embodiments where the classifier scheduler disables classifiers that failed to classify a signal when another classifier successfully classifies the signal, the resources that would have been used by the disabled classifiers are saved for other uses, thus improving device efficiency.

A signal detector output may be used by the classifier scheduler as a control on classifier use. For example, when the signal detector output indicates that there is no signal present, all classifiers can be disabled, thus saving the resources otherwise consumed by the classifiers. When the signal detector output indicates that a signal is present, classifiers can be enabled according to a classifier plan.

The signal detector may produce at least an output indicating whether a signal is present or a signal is not present. A signal detector also may indicate a confidence value indicating how likely the signal present/not present output is to be correct, detected signal power levels, metadata such as the time the signal was first detected, direction from which the signal arrived, etc. The output or outputs of the signal detector may be used by the classifier scheduler as factors in controlling the enabling and disabling of classifiers as described elsewhere herein. The signal detector outputs also can be used by the interference management component as described elsewhere herein. Signal detection can be done by any methods known to those with skill in the art. For example, signal detection may be performed by use of Fast Fourier Transforms to convert the signal to a power spectrum, and examination of the bin values to locate bins with higher than background power levels.

The interference management component may maintain interference levels for primary spectrum users at or below an acceptable level. This can be done by various known means, such as selecting frequencies not in use by primary users, reducing transmit power levels, making transmissions directional and along paths that do not intersect with primary user receivers, etc. Detection of primary user transmissions may be critical to avoiding interference with primary users, while still sharing primary user frequency bands. Outputs from classifiers are usually used for detection of primary user transmissions; however, in some cases, signal detector output alone may be usable to support a channel selection decision. In some configurations, a policy may include elements that alter channel selection choices based on detector output without using a classifier. In one specific example operating mode, a detector signal alone may indicate that a detected signal on a particular channel or range of channels exceeds an upper power amplitude limit for reliable use. In this situation, the channel is unusable and there is no need to classify the signal. In another example use mode, a detected signal may have a spectral bandwidth consistent with a particular signal type or protocol such as Wi-Fi or a cellular communication protocol. In this case, a policy may dictate that the channel should be avoided with classification or may dictate that a particular classifier associated with classifying the suspected signal type indicated by the detector signal characteristics be run first or exclusively. Classifier outputs and signal detector outputs may provide critical information to the interference management component, enabling it to differentiate between empty spectrum, primary user use of spectrum, and secondary user use of spectrum. The interference management component produces outputs useful for selecting, or controlling various aspects of device behavior, such as transmission frequencies in use by the device, changes in transmission frequencies, transmission power levels, timing of transmissions, directionality of transmissions, and coordination of frequency or channel use with other devices. The interference management component uses the classifier and signal detector outputs according to policy requirements.

The above described capabilities may enable a number of useful improvements over the prior art. These include, but are not limited to, removal of outdated, malfunctioning, or inefficient classifiers from service; improved and flexible configuration of classifier use that improves efficiency and can reduce the time required to classify a signal; making classifier use location, time, device, device resource, and signal presence dependent; enabling a device to adapt its use of its classifiers to its current signal conditions and resource availability and load; and potentially reducing battery drain for mobile devices without reducing classifier performance.

Using the above methods in conjunction with appropriate policies, a DSA device can avoid unacceptable interference with primary spectrum users, even when the primary users are behaving in a manner that mimics a secondary user, or in a manner that cannot be classified by available classifiers, such as by use of a new or proprietary signal type. Obsolete or malfunctioning classifiers can be removed from service through policy changes, and classifier use patterns can be made adaptable to the conditions being experienced by a DSA device, as well as to its current capabilities and resources. These capabilities enhance the efficiency of DSA devices, reduce unacceptable interference with primary users, and can prolong battery life in some scenarios for mobile devices.

4.1 Illustrative System Functionality

Figure 4:
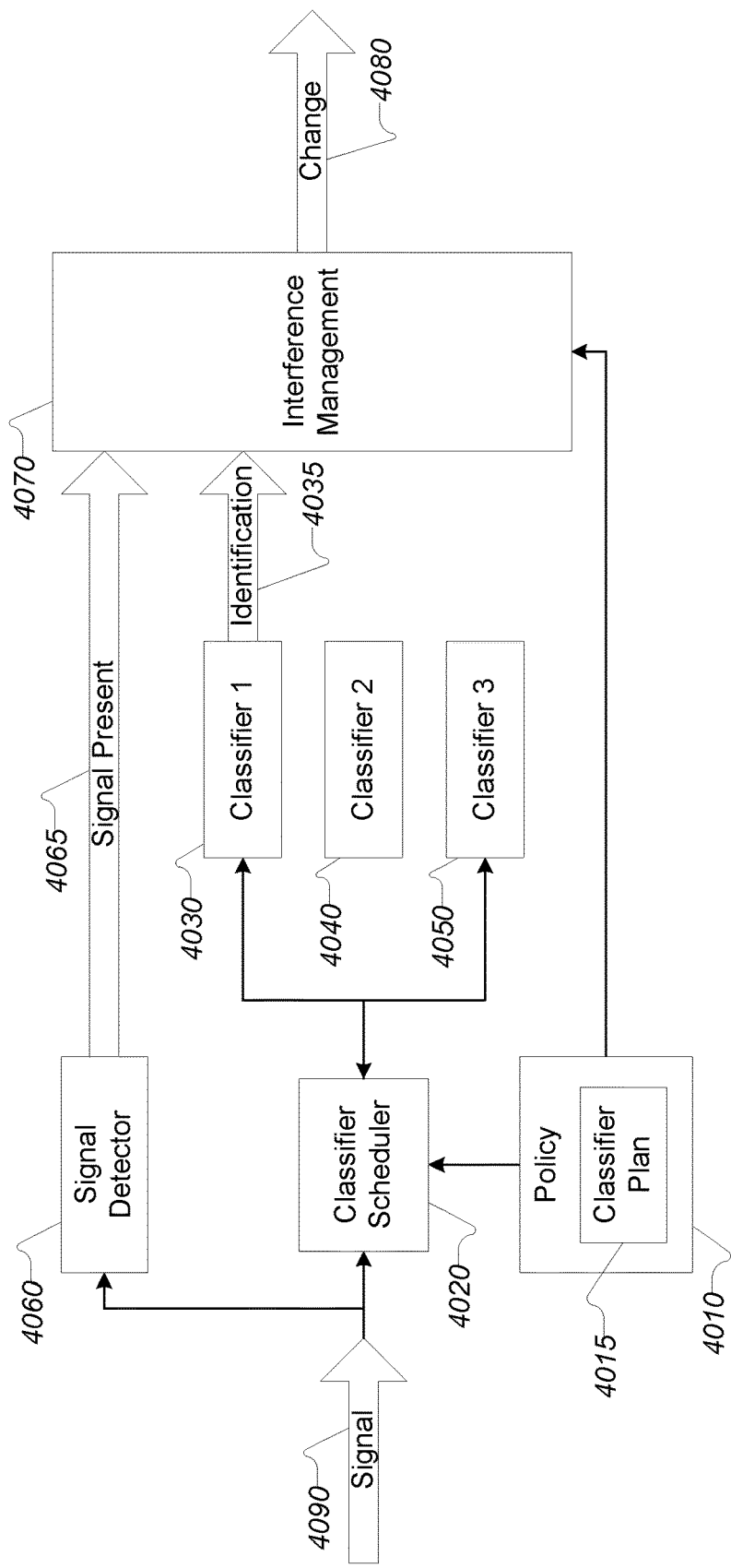
FIG. 4 is a diagram of a portion of an illustrative implementation processing a channel with a primary user signal present that is classifiable under policy by Classifier 1.

FIG. 4 is a diagram of an illustrative embodiment of the current invention processing a signal of a first frequency band. A frequency band is defined by a lower frequency boundary and an upper frequency boundary, and includes the frequency range between these boundaries. The illustrative embodiment is similar to the device shown in FIG. 1, but with the addition of a policy component (4010) that is used, at least in part, to specify a classifier plan that is implemented by the classifier scheduler (4020) to enable or disable the classifiers (4030, 4040, & 4050) used for analysis of the input signal (4090) as disclosed herein. The device also includes signal detection (4060) and interference management (4070) processing components. Signal detection (4060) may be useful to determine whether a signal is present or not present. Interference management may be useful to determine whether mitigation of interference is required or not, and if mitigation is required, what form it should take under the current policy. Options for mitigation are well understood by those with skill in the art, and include, without limitation, changing the frequency band in use, reducing transmitted power levels, altering transmission direction away from primary user sites, and ceasing transmission.

The input (4090) is sent to the signal detection component (4060), which determines that there is a signal present and outputs a "signal present" result (4065) to the interference management processing component (4070). The signal is also sent to the classifier scheduler (4020) which uses the classifier plan supplied by policy (4010) to determine the classifiers to enable (4030 & 4050) for classifying the signal under the current circumstances (e.g. date, time, location, device resources, etc). The classifier prohibited by the current policy (4040) is disabled and/or not given the signal to process.

As another example, the signal may be supplied to all classifiers (4030, 4040, & 4050), and each of the classifiers uses policy (4010) to determine whether to classify the signal, and/or whether to output a result. As another example, the signal may be given to all classifiers (4030, 4040, & 4050), which each output a result, and the results are filtered according to policy (4010) such that only outputs from enabled classifiers are supplied to the interference management processing component (4070). As another example, the signal may be given to all classifiers (4030, 4040, & 4050), which each output a result, and the interference management processing component (4070) uses only the outputs from classifiers enabled by policy (4010) in determining how to manage interference.

In the example shown in FIG. 4, Classifier 1 (4030) identifies the signal as a primary user signal (4035) to the interference management processing component (4070), which determines that the proper response is to vacate the frequency band (4080) since the signal was classified as being that of a primary user and policy (4010) in this case required vacating a frequency band that is in use by a primary user. In alternative scenarios other actions may be required, such as reducing transmitted power levels, controlling directionality, or other methods of controlling interference with the primary user.

Figure 5:
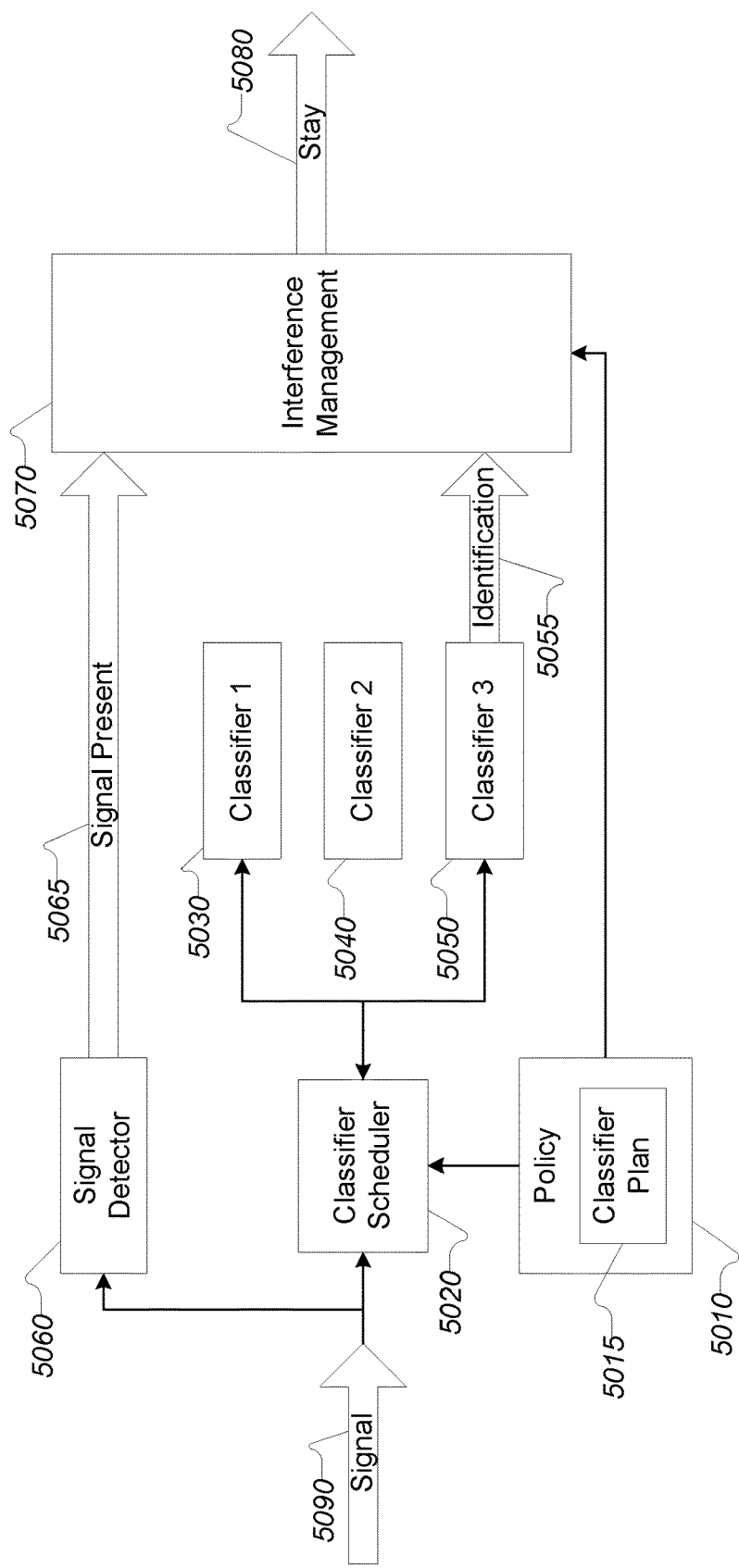
FIG. 5 is a diagram of a portion of an illustrative implementation processing a channel with a secondary user signal present that is classifiable under policy by Classifier 3.

FIG. 5 is a diagram of an illustrative embodiment of the current invention processing a signal of a second frequency band. The signal input (5090), signal detection (5060) and output indicating that a signal is present (5065) occur as previously described for FIG. 4. In the example shown in FIG. 5, Classifier 3 (5050) identifies the signal as a secondary user signal (5055). Classifier 1 (5030) does not classify the signal, and classifier 2 (5040) is disabled by the classifier plan of the current policy (5010). The decision of interference management (5070) is, therefore, not to vacate the frequency (5080) since the signal is not that of a primary user.

Figure 6:
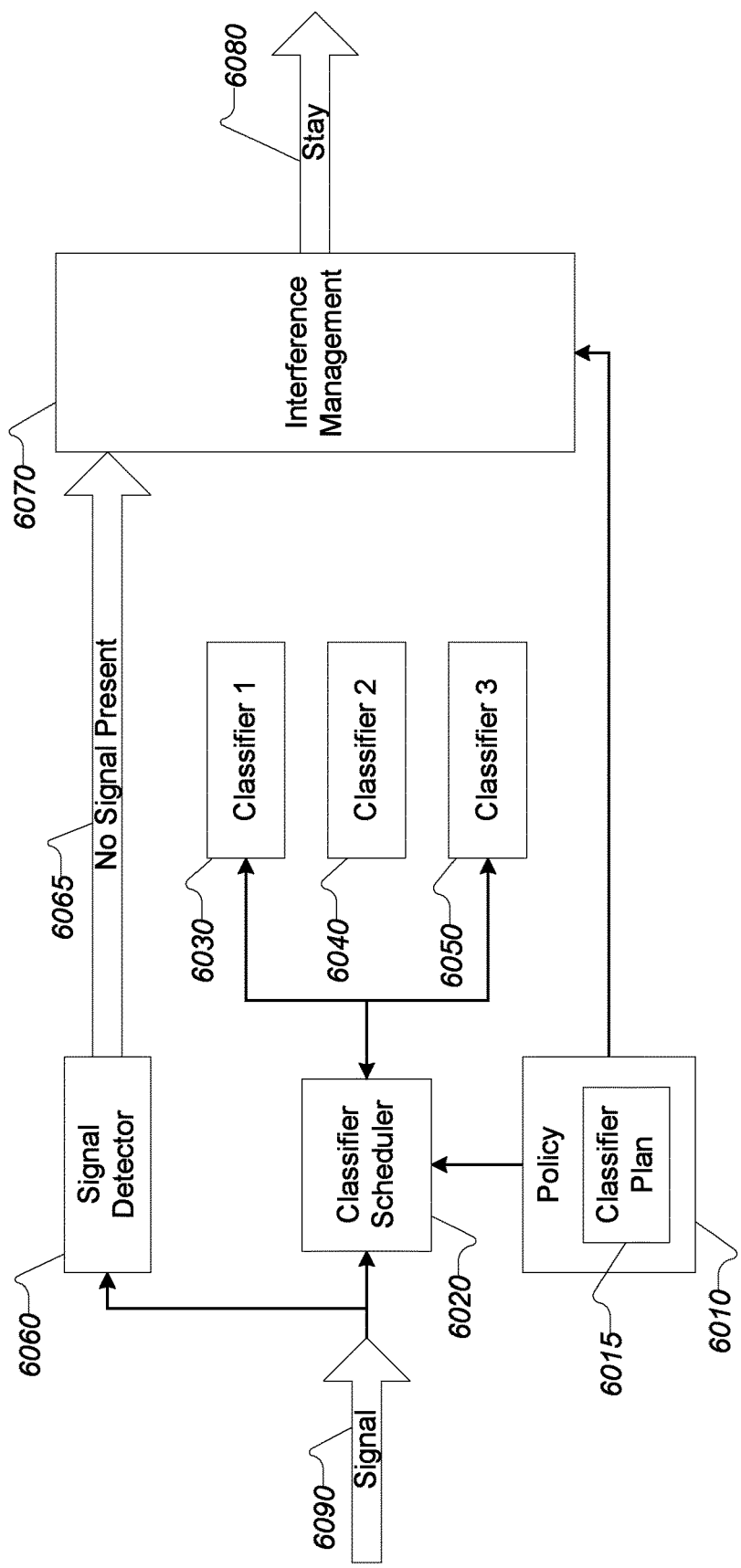
FIG. 6 is a diagram of a portion of an illustrative implementation processing a channel with no signal present.

FIG. 6 is a diagram of an illustrative embodiment of the current invention processing an input from a third frequency band (6090). In the example shown in FIG. 6, there is no signal, so the signal detection (6060) output indicates that there is no signal present (6065). Classifier 2 (6040) is disabled due to the classifier plan of the current policy (6010). The enabled classifiers (6030 & 6050) have no identification outputs since there is no signal present (6065), and the interference management processing (6070) therefore determines that no frequency change (or other mitigating action) is required (6080).

Figure 7:
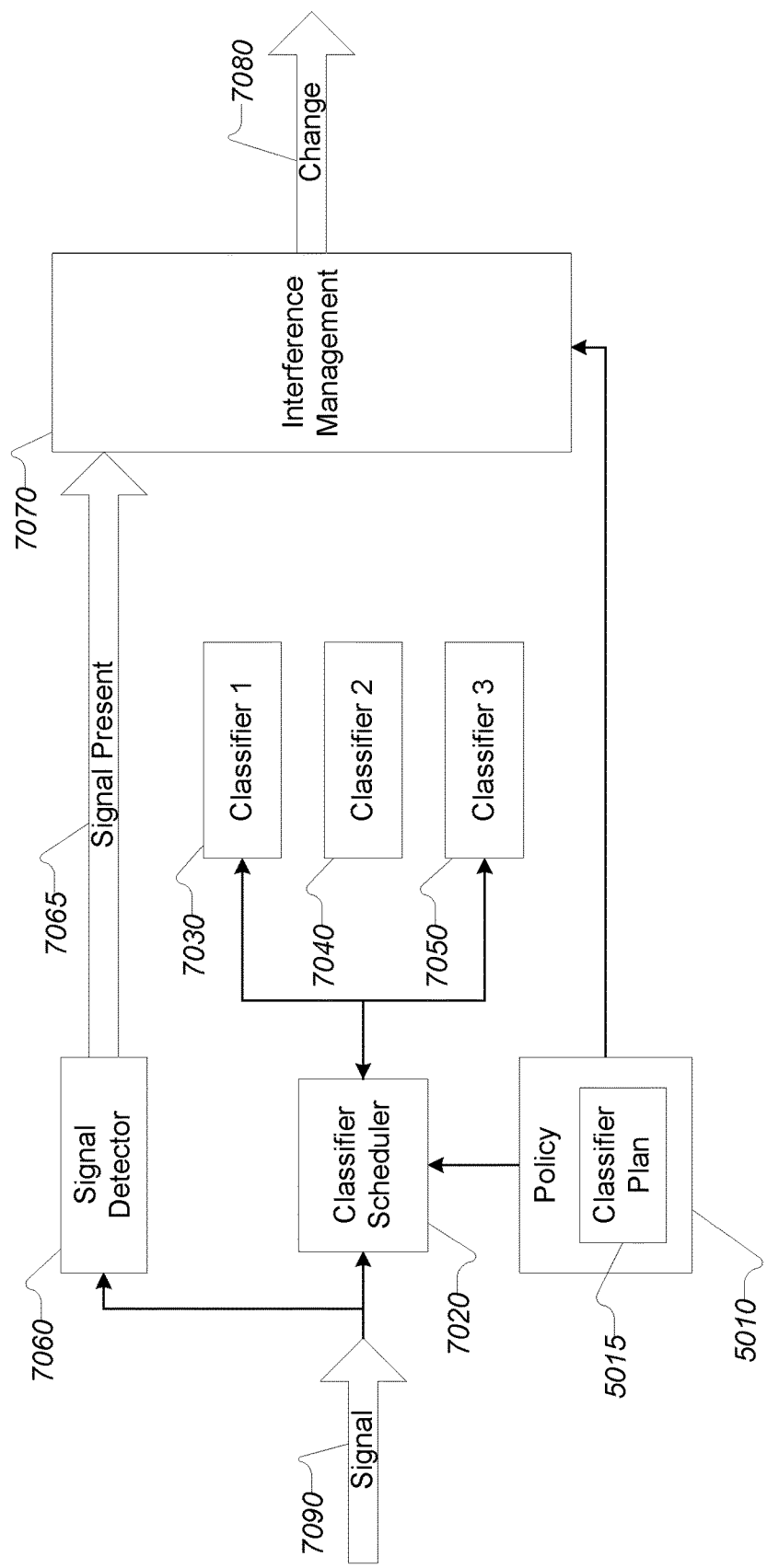
FIG. 7 is a diagram of a portion of an illustrative implementation processing a channel with a signal present that is not classifiable by any available classifier permitted by policy.

FIG. 7 is a diagram of an illustrative embodiment of the current invention processing a signal of a fourth frequency band (7090). In the example shown in FIG. 7, there is a signal, so signal detection (7060) outputs a result indicating that a signal is present (7065) to the interference management processing component (7070). The policy (7010) however, prohibits use of Classifier 2 (7040), which is the classifier in this case that would have been able to classify the signal (7090). Classifier 1 (7030) and Classifier 3 (7050) are unable to classify the signal, so no classification of the signal is made. The interference management processing component (7070) has no input as to the nature of the signal to use in determining whether interference management is needed. Policy can specify the actions to take in such circumstances however, such as assuming that an unknown signal is a primary user (i.e. use the safest assumption to avoid interfering with primary users) and the interference management processor can therefore assume that the unknown signal is a primary user, and output a "vacate" result (7080) (or take other actions as specified by policy). The same result occurs even when all three classifiers (7030, 7040, & 7050) are enabled if the signal is of a type that no available classifier can identify (i.e. classification would require use of a fourth classifier that is not available in the example of FIG. 7).

Figure 8:
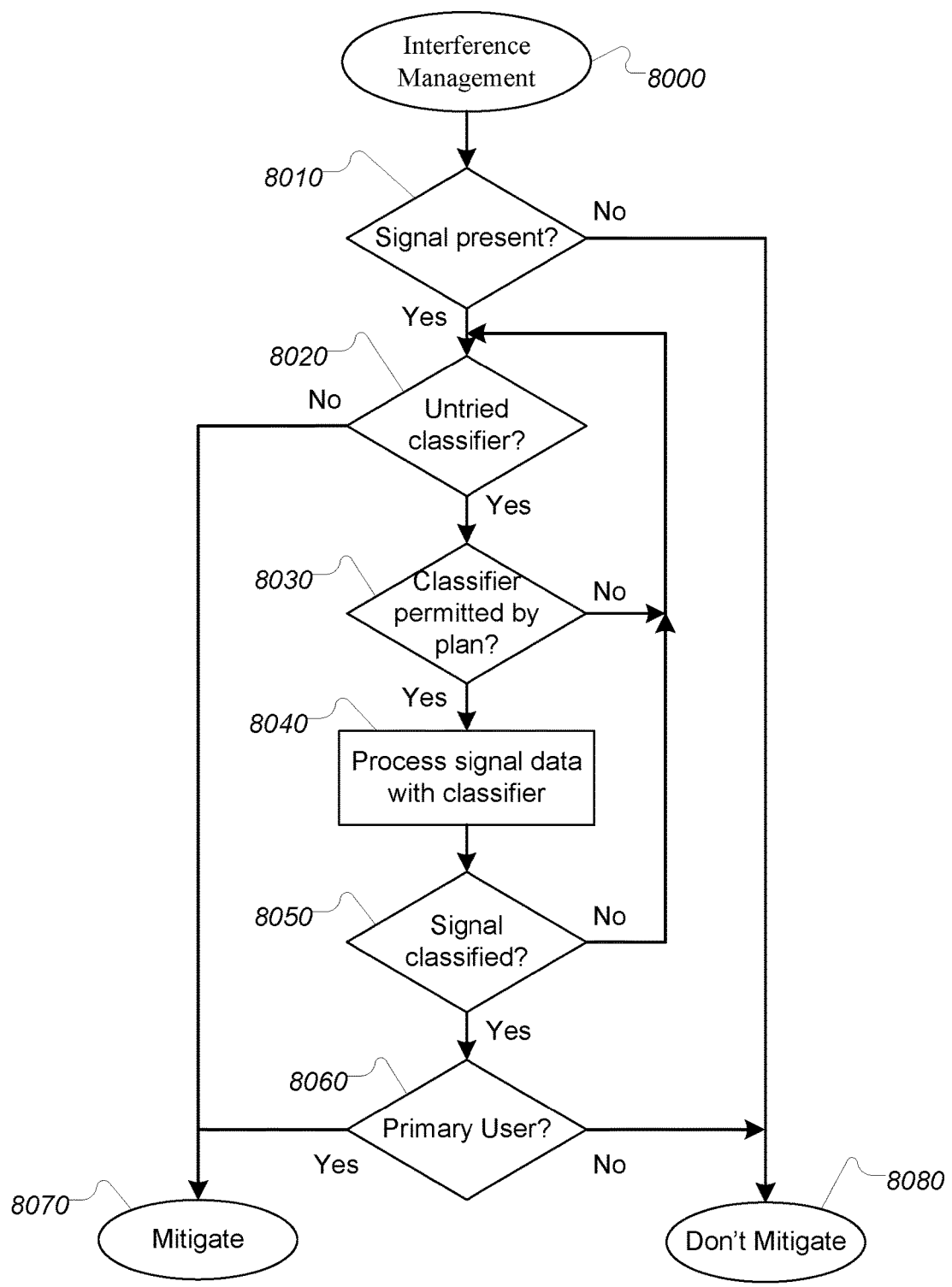
FIG. 8 depicts a flowchart of a possible process for using policy controlled classifiers for determining whether to mitigate interference.

FIG. 8 is a flowchart of an example process according to an embodiment of the invention for determining whether to mitigate interference in a frequency band using classifiers sequentially, rather than in parallel as described above. The process (8000) first checks to see whether a signal is present (8010). This is done by a signal detection component using methods well known to those with skill in the art, such as computing a power spectrum and comparing the power at the frequency against the noise floor and employing a threshold to determine signal presence or absence. Additional processing may be performed, for example, when power above the noise floor is detected in order to eliminate false signal detections from noise spikes, such as are caused by lightning, or man-made causes such as power transmission lines. If there is no signal present (8010), the decision is that mitigation of interference in the frequency band is not required (8080) since there is no current primary user use of the frequency band.

If a signal is present (8010), then available classifiers that are enabled by the current classifier plan of the current policy are tried one after another until all have been tried, or the signal is classified to an acceptable confidence level. To carry out this processing, an untried classifier is selected (8020). If there are no untried classifiers (8020), the signal is determined to be unclassifiable and policy determines any required actions. For example, policy can specify that in the presence of an unclassifiable signal, an assumption should be made that the signal is that of a primary user, and the decision is to perform mitigation of interference in the frequency band (8070). If there is an untried classifier (8020), a check is made to see if its use is permitted by the current classifier plan (8030). If the classifier is disabled by the current classifier plan (8030) the classifier is not used, and a check for another untried classifier is performed (8020). If the classifier is enabled by the current classifier plan (8030) the classifier is used to attempt classification of the signal (8040). If the classifier was unable to classify the signal (8050), a check is made to see if there is another untried classifier (8020). If the classifier successfully classified the signal (8050) a check is made to see if the signal is that of a primary user (8060). If the signal is that of a primary user (8060), the decision is to perform interference mitigation in the frequency band (8070), otherwise, the decision is to not perform interference mitigation in the frequency band (8080).

It will also be recognized by those skilled in the art that, while the invention has been described above in terms of preferred embodiments, examples, and configurations, it is not limited thereto. Various features and aspects of the above described invention may be used individually or jointly. Further, although the invention has been described in the context of its implementation in a particular environment, and for particular applications (e.g. DSA device mitigation of interference with primary spectrum users), those skilled in the art will recognize that its usefulness is not limited thereto and that the present invention can be beneficially utilized in any number of environments and implementations where it is desirable to use policy to control use of optional processing components, both as to their enabled/disabled status as well as their order of employment. Accordingly, the claims set forth below should be construed in view of the full breadth and spirit of the invention as disclosed herein.

5 EXAMPLES OF USE

The following examples of use are provided to illustrate certain aspects of the present invention and to aid those of skill in the art in practicing the invention. These examples are in no way to be considered a limitation on the scope of the invention in any manner.

5.1 Military Radio Interference Avoidance

Detection and classification of well known and standardized signals, such as television, commercial broadcast radio, cell phones, and 802.11 Wi-Fi, is well understood, but classification of some types of signals, such as military communications or sensing signals (e.g. radar), can be problematic. Civilian signals generally use known frequencies, have published characteristics useful to identify them, and are detectable using typical classifier methods. In the case of military signals, however, typical classifier methods are sub-optimal or even non-functional. Military signal characteristics are generally not published, and may even be treated as national secrets. Military communication and sensing signals, in order to achieve required levels of accuracy, timing, and stealth, may use a wide range of frequencies, switch rapidly between frequencies, and use transmission patterns designed to mimic transmissions that might be expected in a given area so as to blend in with civilian patterns of spectrum use. In addition to military radars, there is potential for other primary user systems, such as police, intelligence, or other investigative organizations, to make use of similar techniques. In some cases, civilian businesses that may have need to transmit RF in ways that are not easily detected or tracked also may want to use these techniques. For example, a vehicle tracking and recovery system, such as Lojack (a product of LoJack Corporation of Canton, Mass.) or police vehicle trackers, have need to transmit RF on occasion, but doing so in a way that can be identified reduces the effectiveness of these systems. By using unpublished or stealth methods, primary users can make their signals unclassifiable, or have them be mistakenly classified as secondary users making DSA use of spectrum assigned to a primary user, and thus prevent triggering secondary users to vacate the frequencies being used or otherwise mitigate interference. This can result in unwanted, and in some cases unlawful, interference with such signals, making DSA radio co-existence problematic. Where interference with such signals must be avoided, the only current method available is to block off the required spectrum from DSA use, which decreases the efficiency of spectrum use and is contrary to the goals of DSA. In some cases such blocking of relatively large portions of spectrum may be unnecessary and inefficient if, instead, such spectrum use can be reliably detected to a degree sufficient to allow a DSA device or system to make use of the relevant region of spectrum without interfering with these uses, even if the particular signal is not classified. Thus, improved methods as disclosed herein for dealing with unclassifiable signals, or primary user signals that can be mistaken for secondary signals, may be desirable to avoid this.

Avoiding interference with primary users that are employing stealth techniques, such as mimicking secondary users, or which have characteristics that are not known widely enough for DSA devices to have working classifiers for them, may require that secondary user DSA devices treat unclassifiable signals as primary users, and that secondary DSA devices be configured so as to ensure that stealthed primary user transmissions are not classifiable even when DSA devices incorporate classifiers capable of identifying the signals that the stealthed primary users are mimicking.

The first requirement can be met by configuring secondary user DSA devices with policies that require vacating frequencies, or taking other actions to mitigate interference, unless detected signals can be positively identified as being of secondary user origin or signal-like noise. In such a configuration, if a DSA device with such a policy requirement detects a signal, and cannot identify it as a secondary user signal or noise, it must assume the signal is from a primary user and change frequencies or take other appropriate interference mitigating action, such as reducing transmitter power, directing its transmissions away from primary user sites, or ceasing transmitting.

The second requirement, configuration to ensure that the stealthed primary user transmissions are not classifiable, can be met through use of a classifier plan specified in or by policy that controls classifier use by DSA devices as described herein. The classifier plan can prohibit use of any classifier that is capable of classifying a signal of the type that the primary user is mimicking. By prohibiting use of such classifiers, the DSA radio will be rendered unable to classify the stealthed primary user signal, and due to the policy requirement to treat unclassifiable signals as primary user signals, will treat the unclassifiable signal as a primary user signal and vacate the frequency or take other interference mitigating actions. This may cause a DSA device to vacate frequencies that are only being used by actual secondary users of the type the prohibited classifier(s) are capable of identifying, but this is preferable to remaining on the frequency when the detected user is a primary user employing stealth methods. Specification of the classifiers that are permitted, and those that are prohibited, can be specified by classifier plans in policy that can vary from place to place, time to time, by frequency band, or otherwise so as to permit reserving only the spectrum needed by primary users during the times and in the places where this is needed (e.g. in Military Operation Areas (MOAs) during scheduled training). Policy specifications also can be limited by device, device type, by groups of devices, or in other ways, such as possession of a digital certificate, so as to enable some DSA devices to classify the signals, while others are prevented from doing so, thus enabling military use of civilian devices when necessary or desirable.

The invention claimed is:

1. A device comprising:
    a radio receiver configured to generate a digital radio signal responsive to electromagnetic energy detected in a selected radio frequency (RF) spectral band;
    a plurality of signal classifiers, each classifier of the plurality of signal classifiers configured to identify a type of RF signal based upon the electromagnetic energy detected in the selected RF spectral band; and
    a classifier scheduler configured to control operation of the plurality of signal classifiers at least in part by generating a classifier plan that specifies a restriction on use of at least one of the plurality of signal classifiers.

2. The device of claim 1, wherein the classifier plan specifies that at least two of the plurality of signal classifiers are to be operated in parallel.

3. The device of claim 1, wherein the classifier plan specifies an order of use of the plurality of signal classifiers.

4. The device of claim 1, wherein the restriction on use of at least one of the plurality of classifiers is based upon one or more conditions selected from the group consisting of: a location of the device; a movement speed of the device; a time of day; a time of year; a frequency; a frequency range; a completion status of one or more of the plurality of classifiers; an availability of at least one resource available to the device; an elapsed time since a classifier successfully classified a signal; and a signal power level.

5. The device of claim 1, wherein the restriction on use of at least one of the plurality of classifiers specifies a classifier that is disabled.

6. The device of claim 1, wherein the classifier plan specifies an order of use of the plurality of classifiers based upon the likelihood that each of the plurality of classifiers will be successful in classifying a signal.

7. The device of claim 1, wherein the classifier plan specifies at least one operational parameter selected from the group consisting of: a capability of one of the plurality of classifiers; an identification of one of the plurality of classifiers; an operational status of one of the plurality of classifiers; and an efficiency of operation of one of the plurality of classifiers.

8. The device of claim 1, further comprising:
    an interference manager configured to determine if the selected RF spectral band is available for radio communication by the device based upon an output of at least one of the plurality of signal classifiers.

9. The device of claim 1, further comprising:
    a policy manager configured to provide policy information to the classifier scheduler, the policy information describing the at least one restriction on use of at least one of the plurality of signal classifiers; and
    a computer-readable data storage storing at least one policy, wherein the policy manager is configured to update the at least one policy.

10. The device of claim 1, wherein each of the plurality of signal classifiers is configured to receive data from a digital signal detector based upon the electromagnetic energy detected in the selected RF spectral band, and wherein each of the plurality of signal classifiers is configured to identify the type of signal based upon the data from the digital signal detector.

11. The device of claim 10, wherein the device further comprises the digital signal detector.

12. The device of claim 1, further comprising a channel manager configured to select the selected RF spectral band.

13. The device of claim 1, wherein the radio receiver comprises a transceiver.

14. A method comprising:
    receiving a potential RF signal within an RF spectral band;
    generating a classifier plan that specifies operation of at least one classifier of a plurality of signal classifiers, each classifier of the plurality of signal classifiers configured to identify a type of RF signal based upon the electromagnetic energy detected in the RF spectral band, wherein the classifier plan specifies a restriction on use of at least one of the plurality of signal classifiers; and
    operating the at least one classifier according to the classifier plan to generate a classification of the potential RF signal.

15. The method of claim 14, wherein the classification indicates that the potential signal is a type of RF signal that the at least one classifier is configured to identify.

16. The method of claim 14, wherein the classifier plan specifies that at least two of the plurality of signal classifiers are to be operated in parallel.

17. The method of claim 14, wherein the classifier plan specifies an order of use of the plurality of signal classifiers.

18. The method of claim 14, wherein the restriction on use of at least one of the plurality of classifiers is based upon one or more conditions selected from the group consisting of: a location of the device; a movement speed of the device; a time of day; a time of year; a frequency; a frequency range;

a completion status of one or more of the plurality of classifiers; an availability of at least one resource available to the device; an elapsed time since a classifier successfully classified a signal; and a signal power level.

19. The method of claim 14, wherein the restriction on use of at least one of the plurality of classifiers specifies a classifier that is disabled.

20. The method of claim 14, wherein the classifier plan specifies an order of use of the plurality of classifiers based upon the likelihood that each of the plurality of classifiers will be successful in classifying a signal.

21. The method of claim 14, wherein the classifier plan specifies at least one operational parameter selected from the group consisting of: a capability of one of the plurality of classifiers; an identification of one of the plurality of classifiers; an operational status of one of the plurality of classifiers; and an efficiency of operation of one of the plurality of classifiers.

22. The method of claim 14, further comprising:
determining if the RF spectral band is available for radio communication by an RF communication device based upon an output of at least one of the plurality of signal classifiers.

23. The method of claim 14, further comprising:
providing policy information to the classifier scheduler, the policy information describing the at least one restriction on use of at least one of the plurality of signal classifiers.

* * * * *